United States Patent
Aslan et al.

(10) Patent No.: US 7,858,195 B2
(45) Date of Patent: Dec. 28, 2010

(54) ANTIADHESIVE HIGH TEMPERATURE LAYERS

(75) Inventors: Mesut Aslan, Hoeheischweiler (DE); Robert Drumm, Saarbruecken (DE); Klaus Endres, Sulzbach (DE); Hareesh Nair, Saarbruecken (DE); Bernd Reinhard, Merzig-Brotdorf (DE); Helmut Schmidt, Saarbruecken-Guedingen (DE)

(73) Assignee: Leibniz-Institut Fuer Neue Materialien Gemeinnuetzige GmbH, Saarbruecken (DE)

(*) Notice: Subject to any disclaimer, the term of this patent is extended or adjusted under 35 U.S.C. 154(b) by 1272 days.

(21) Appl. No.: 11/293,184

(22) Filed: Dec. 5, 2005

(65) Prior Publication Data

US 2006/0159909 A1    Jul. 20, 2006

Related U.S. Application Data

(63) Continuation of application No. PCT/EP2004/006326, filed on Jun. 11, 2004.

(30) Foreign Application Priority Data

Jun. 13, 2003 (DE) ................ 103 26 815

(51) Int. Cl.
*B32B 9/04* (2006.01)
*C10M 155/02* (2006.01)

(52) U.S. Cl. ............... 428/446; 428/447; 428/450; 428/702; 428/704; 508/126; 508/127; 508/129; 508/136; 508/167; 508/171; 508/172; 508/173; 508/201; 508/202; 508/207; 508/208

(58) Field of Classification Search .............. None
See application file for complete search history.

(56) References Cited

U.S. PATENT DOCUMENTS

| | | | | |
|---|---|---|---|---|
| 3,909,424 | A * | 9/1975 | Clark .................. | 508/121 |
| 5,593,781 | A | 1/1997 | Nass et al. | |
| 5,910,522 | A | 6/1999 | Schmidt et al. | |
| 6,291,070 | B1 | 9/2001 | Arpac et al. | |
| 6,589,919 | B2 | 7/2003 | Fukunaga et al. | |
| 6,696,392 | B2 * | 2/2004 | Naik et al. .......... | 508/121 |
| 6,797,372 | B2 * | 9/2004 | Lee et al. ............ | 428/323 |
| 2001/0056141 | A1 * | 12/2001 | Schutt .................. | 524/261 |
| 2002/0022580 | A1 | 2/2002 | Fukunaga et al. | |
| 2003/0072962 | A1 * | 4/2003 | Matsuzaki et al. ...... | 428/623 |
| 2003/0224947 | A1 | 12/2003 | Naik et al. | |

FOREIGN PATENT DOCUMENTS

| | | |
|---|---|---|
| DE | 4212633 | 10/1993 |
| DE | 1 9746885 | 6/1999 |
| JP | 8-73777 | * 3/1996 |
| JP | 8-134489 A | * 5/1996 |
| JP | 9-295102 A | 11/1997 |
| JP | 11-199880 | * 7/1999 |
| JP | 11-199880 A | * 7/1999 |
| JP | 2000-191786 A | 7/2000 |
| JP | 2000-202835 A | 7/2000 |
| JP | 2001-353550 A | 12/2001 |
| JP | 2001-526719 | 12/2001 |
| JP | 2003-164956 A | 6/2003 |
| KR | 2002-0075958 A | 10/2002 |
| WO | 93/21127 | 10/1993 |
| WO | 96/31572 | 10/1996 |
| WO | 98/51747 | 11/1998 |
| WO | 00/53702 | 9/2000 |
| WO | 02/090474 | 11/2002 |

OTHER PUBLICATIONS

Machine translation of JP 8-73777.*
Machine translation of JP 11-199880.*
Abstract for DE 10313630 A1 (Oct. 2004).*
Abstract for JP 11-199880.*
Abstract for jp 8-134489.*
Römpp Chemielexikon, 9$^{th}$ edition, Georg Thieme Verlag, 1992, pp. 4690-4691.
Ullmans Encyklopädie der technischen Chemie, 4$^{th}$ edition, Verlag Chemie, 1981, vol. 20, pp. 457-460 and 530-537.
English language abstract of JP 2000-191786 A.
English language abstract of JP 2003-164956 A.
English language abstract of JP 9-295102 A.
English language abstract of JP 2000-202835 A.
English language abstract of JP 2001-353550 A.
English language abstract of KR 2002-0075958 A.

* cited by examiner

*Primary Examiner*—Marc S Zimmer
(74) *Attorney, Agent, or Firm*—Greenblum and Bernstein, P.L.C.

(57) ABSTRACT

A substrate having an anti-adhesive coating thereon. The coating is made from a coating composition comprising solid particles of a release agent different from boron nitride and a binder comprising surface-modified nanoscale solid particles.

34 Claims, No Drawings

ANTIADHESIVE HIGH TEMPERATURE LAYERS

CROSS-REFERENCE TO RELATED APPLICATIONS

The present application is a continuation of International Application No. PCT/EP2004/006326, filed Jun. 11, 2004, the entire disclosure whereof is expressly incorporated by reference herein, which claims priority under 35 U.S.C. § 119 of German Patent Application 103 26 815.4, filed Jun. 13, 2003.

BACKGROUND OF THE INVENTION

1. Field of the Invention

The present invention relates to a substrate with an anti-adhesive coating based on a coating composition which comprises a) solid particles of a release agent excluding boron nitride and b) a binder comprising surface-modified nanoscale solid particles.

2. Discussion of Background Information

Thermally resistant anti-adhesive coatings are of high significance for industrial applications. Materials which have such anti-adhesive properties are known in the prior art. They are very frequently materials having a pronounced sheet structure and particular electronic properties, such as graphite, but also certain sulfides such as tungsten sulfide, or molybdenum sulfide. However, the application of these materials to surfaces is particularly difficult since, for example, graphite can only be deposited on surfaces with great difficulty, if at all. One solution consists in the use of binders which are capable, for example, of binding graphite particles to surfaces in a firmly adhering manner. Owing to the antiadhesive properties of graphite, this is generally, though, possible only with organic polymers which are, however, not high-temperature-stable.

It would be desirable to be able to provide anti-adhesive coatings which are stable even at high temperatures. Surprisingly, this can be achieved by a binder which comprises surface-modified nanoscale solid particles.

SUMMARY OF THE INVENTION

The present invention provides substrate having a coating thereon. The coating is anti-adhesive and is made from a coating composition that comprises (a) solid particles of at least one release agent different from boron nitride, and (b) a binder comprising surface-modified nanoscale solid particles.

In one aspect, the particles (a) may have a sheet lattice structure and/or the at least one release agent may be selected from one or more of graphite, graphite compounds, metal sulfides, metal selenides and metal tellurides, such as, e.g., $MoS_2$, $WS_2$, $WSe_2$, $NbS_2$, $NbSe_2$, $TaS_2$, $TaSe_2$, $AsSbS_4$ and $AsAsS_4$. For example, the at least one release agent may comprise one or more of graphite, fluorinated graphite, $MoS_2$ and $WS_2$.

In another aspect of the substrate of the present invention, the binder may comprise a nanocomposite composed of the nanoscale solid particles in an organically modified inorganic polycondensate or precursor thereof. For example, the organically modified inorganic polycondensate or precursor thereof may comprise an organically modified inorganic polysiloxane or precursor thereof and/or the nanocomposite may be obtainable by a sol-gel process by reacting nanoscale solid particles with one or more silanes of general formula:

$$R_xSiA_{(4-x)}$$

wherein the radicals A are the same or different and are hydroxyl groups or hydrolyzable groups, the radicals R are the same or different and are non-hydrolyzable groups and x is 0, 1, 2 or 3, where $x \geq 1$ in at least 50 mass-% of the one or more silanes.

In yet another aspect of the substrate of the present invention, the nanoscale solid particles may be selected from one or more of metal oxide particles and carbon black particles. For example, the nanoscale solid particles may comprise one or more of $SiO_2$, $TiO_2$, $ZrO_2$, $Al_2O_3$, AlOOH, $Y_2O_3$, $CeO_2$, $SnO_2$, iron oxides and $Ta_2O_5$.

In a still further aspect, the nanoscale solid particles may have been surface-modified with a surface modifier having a molecular weight of less than 1,500. In another aspect, the surface modifier may comprise one or more of an anhydride group, an amide group, an amino group, a SiOH group, a hydrolyzable silane radical and a β-dicarbonyl group.

In still further aspects of the substrate, the coating composition may further comprises one or more inorganic fillers and/or the particles (a) may have an average particle diameter of less than 100 μm and/or the coating may comprise from 20 to 80% by weight of the particles (a) and/or the coating may comprise less than 70% by weight of the nanoscale solid particles and/or the nanoscale solid particles may have an average particle diameter of not more than 100 nm and/or the substrate may comprise metal, glass and/or ceramic and/or the coating may comprise a tribological layer and/or the coating may comprise a high-temperature-resistant layer.

The present invention also provides a mold, e.g., a metal casting mold, which comprises a mold release layer. This mold comprises the substrate of the present invention, including the various aspects thereof set forth above.

The present invention also provides a substrate having an anti-adhesive coating thereon. The coating is made from a coating composition that comprises (a) solid particles of at least one release agent selected from one or more of graphite, graphite compounds, metal sulfides, metal selenides and metal tellurides, and (b) a binder comprising surface-modified nanoscale solid particles.

In one aspect of the substrate, the particles (a) may comprise one or more of graphite, fluorinated graphite, $MoS_2$ and $WS_2$.

In another aspect, the binder may comprise a nanocomposite composed of the nanoscale solid particles in an organically modified inorganic polycondensate or precursor thereof that comprises an organically modified inorganic polysiloxane or precursor thereof. For example, the nanocomposite may be obtainable by a sol-gel process by reacting the nanoscale solid particles with one or more silanes of general formula:

$$R_xSiA_{(4-x)}$$

wherein the radicals A are the same or different and are hydroxyl groups or hydrolyzable groups, the radicals R are the same or different and are non-hydrolyzable groups and x is 0, 1, 2 or 3, where $x \geq 1$ in at least 50 mass-% of the one or more silanes.

In yet another aspect, the nanoscale solid particles may comprise one or more of $SiO_2$, $TiO_2$, $ZrO_2$, $Al_2O_3$, AlOOH, $Y_2O_3$, $CeO_2$, $SnO_2$, iron oxide and $Ta_2O_5$.

In still further aspects of the substrate of the present invention, the particles (a) may have an average particle diameter of less than 30 µm and/or the coating may comprise from 30 to 70% by weight of the particles (a) and/or the coating may comprise less than 60% by weight of the nanoscale solid particles and/or the nanoscale solid particles may have an average particle diameter of not more than 50 nm.

The present invention also provides a coating composition for application onto a substrate. The coating composition in a cured state is capable of forming an anti-adhesive coating on the substrate and comprises (a) solid particles of at least one release agent different from boron nitride, and (b) a binder comprising surface-modified nanoscale solid particles.

The present invention also provides a method of providing a substrate with an anti-adhesive coating. This method comprises applying the coating composition of the present invention set forth above, including the various aspects thereof, onto the substrate and curing the applied coating composition.

As set forth above, the present invention relates to a substrate with an anti-adhesive coating, obtainable by applying a coating composition to a substrate and curing, said coating composition comprising (a) solid particles of a release agent excluding boron nitride, and (b) a binder comprising surface-modified nanoscale solid particles.

It has surprisingly been found that surface-modified nanoscale solid particles (nanoscale solid particles are hereafter also referred to as nanoparticles) can develop adhesive action both to very nonpolar surfaces, for example those of graphite, and to polar surfaces, for example those of a substrate. They exhibit a marked bifunctional property.

Owing to this bifunctional property, it is thus possible to prepare suspensions of graphite or other release agent particles in organic solvents, but also in aqueous systems, and to use them as coating compositions on various substrate materials such as metals, glass and ceramic. Coatings on plastics are equally possible, but a high-temperature use is of course possible in that case only within the usually limited thermal stability of the substrate.

It is surprising that the anti-adhesive action of the release agent is retained in such coatings, i.e. the parts of the release agent directed to the atmosphere, for example of graphite, are not entirely surrounded by the binder.

The invention is explained in detail below.

The coating composition used in accordance with the present invention comprises solid particles of a release agent excluding boron nitride (also referred to hereafter as release agent particles). It is of course also possible to use mixtures of different release agent particles. Release agents are substances which can reduce the adhesion forces between adjoining surfaces. Solid release agents are frequently used in the form of particles or powders. The materials used for this purpose are familiar to those skilled in the art. The release agents are sometimes also referred to as lubricants. General overviews can be found in Römpp, Chemielexikon, 9th edition, Georg Thieme Verlag, 1992, p. 4690-4691, and Ullmans Encyklopädie der technischen Chemie, 4th edition, Verlag Chemie 1981, vol. 20, pages 457-672.

The release agent particles are preferably inorganic particles, but organic release agents such as metal-free phthalocyanines or indanthrene dyes are also suitable. Advantageously, materials with a sheet lattice structure are used, but other release agents such as borax or lead oxide-zinc oxide are also suitable.

Examples of suitable release agents with sheet lattice structure are, for example, graphite, graphite compounds such as fluorinated graphite, mica, talc, sulfides, selenides, tellurides, cadmium chloride, lead iodide, cobalt chloride and silver sulfate. Particular preference is given to graphite, graphite compounds and heavy metal sulfides, selenides and tellurides, for example $MoS_2$, $WS_2$, $WSe_2$, $NbS_2$, $NbSe_2$, $TaS_2$, $TaSe_2$, $AsSbS_4$ or $AsAsS_4$.

The release agent particles usually have an average particle diameter of less than 100 µm, preferably less than 30 µm and more preferably less than 10 µm. The average particle diameter relates here, as in the later data too, to the determined volume average, the distributions being determined by using laser diffraction methods (evaluation according to Mie) in the particle size range from 1 to 2000 µm, and a UPA (ultrafine particle analyzer, Leeds Northrup (laser optics)) in the range from 3.5 nm to 3 µm. In the overlap range from 1 to 3 µm, reference is made here to the determination with UPA.

The fraction of the release agent particles, based on the total weight of the coating after curing (finished product), is usually from 5 to 95% by weight, preferably from 20 to 80% by weight and more preferably from 30 to 70% by weight. The release agent particles may be used in the form of a dispersion in a solvent or may be added to the binder as a powder.

The coating composition comprises, as a binder component, surface-modified nanoscale solid particles. It has been found that the release agent particles can be bonded to surfaces in a permanent and thermally stable manner with this binder. In an advantageous embodiment, a surface-modified nanocomposite comprising nanoparticles, in particular in the form of a sol, is used as a binder. A nanocomposite or a nanocomposite sol consists of a mixture of nanoscale solid particles and preferably inorganically or organically modified inorganic polycondensates prepared by the sol-gel process, or precursors thereof. In the coating composition, the binder composed of nanoparticles or nanocomposites is usually present in the form of a sol or a dispersion. In the cured layer, it constitutes a matrix former.

Nanocomposites can be obtained by simply mixing a polycondensate or a precursor thereof, which is preferably obtained from the hydrolyzable starting compounds by the sol-gel process, with surface-modified nanoscale solid particles. However, the formation of the polycondensates or of the precursors from the hydrolyzable starting compounds by the sol-gel process is preferably carried out in the presence of nanoparticles because the nanoparticles are then also surface-modified by the hydrolyzable starting compounds. In this process, non-surface-modified nanoparticles are usually used, since surface modification proceeds during the formation of the polycondensate or of a precursor thereof, but it is also possible to use already surface-modified nanoparticles.

The binder comprises surface-modified nanoparticles. The nanoparticles are preferably inorganic. The nanoparticles may be made of metal, including metal alloys, metal compounds or semiconductor compounds, but carbon modifications such as carbon black or activated carbon are also conceivable. More preferably, the nanoparticles comprise oxides or carbon black. It is possible to use one type of nanoscale solid particles or a mixture of different nanoscale solid particles.

The nanoparticles may be made of any metal compounds, metal here including silicon and boron. Examples are (optionally hydrated) oxides such as $ZnO$, $CdO$, $SiO_2$, $GeO_2$, $TiO_2$, $ZrO_2$, $CeO_2$, $SnO_2$, $Al_2O_3$ (especially boehmite, $AlO(OH)$ also as aluminum hydroxide), $B_2O_3$, $In_2O_3$, $La_2O_3$, $Y_2O_3$, iron oxides (e.g. $Fe_2O_3$, $Fe_3O_4$), $Cu_2O$, $Ta_2O_5$, $Nb_2O_5$, $V_2O_5$, MoO₃ or WO₃; further chalcogenides, for example sulfides (e.g. CdS, ZnS, PbS and Ag₂S), selenides (e.g. GaSe, CdSe and ZnSe) and tellurides (e.g. ZnTe or CdTe); halides such as AgCl, AgBr, AgI, CuCl, CuBr, CdI₂ and PbI₂; carbides such as CdC₂ or SiC; arsenides such as AlAs, GaAs and GeAs; antimonides such as InSb; nitrides such as AlN, Si₃N₄ and Ti₃N₄; phosphides such as GaP, InP, Zn₃P₂ and Cd₃P₂; phosphates, silicates, zirconates, aluminates, stannates and the corresponding mixed oxides (e.g. metal tin oxides such as indium tin oxide (ITO), antimony tin oxide (ATO), fluorine-doped tin oxide (FTO), Zn-doped Al₂O₃, luminous pigments comprising Y- or Eu-containing compounds, spinels, ferrites or mixed oxides with perovskite structure such as BaTiO₃ and PbTiO₃).

The nanoscale inorganic solid particles are preferably an oxide or oxide hydrate of Si, Ge, Al, B, Zn, Cd, Ti, Zr, Y, Ce, Sn, In, La, Fe, Cu, Ta, Nb, V, Mo or W, more preferably of Si, Al, Y, Ti and Zr. Particular preference is given to using oxides or oxide hydrates. Preferred nanoscale inorganic solid particles are SiO₂, TiO₂, ZrO₂, Al₂O₃, AlOOH, Ta₂O₅, Y₂O₃, CeO₂, ZnO, SnO₂, iron oxides, preference being given to SiO₂, TiO₂, ZrO₂, Al₂O₃ and AlOOH, particular preference to SiO₂.

The content of nanoparticles is usually less than 90% by weight, preferably less than 70% by weight and more preferably less than 60% by weight, based on the total weight of the composition after thermal curing (finished product), and can in special cases even be less than 10% by weight. Since the content of release agent can vary greatly, the content of nanoparticles also varies. In the coating composition, the content of nanoparticles, based on the solids content excluding release agent particles, may be, for example, at least 5% by weight.

These nanoscale particles can be produced in a customary manner, for example by flame pyrolysis, plasma methods, colloid techniques, sol-gel processes, controlled nucleation and growth processes, MOCVD methods and emulsion methods. These methods are described comprehensively in the literature. The sol-gel process will be described in more detail below.

Particles based on ZrO₂ or Al₂O₃ may be produced, for example, from zirconium oxide precursors such as zirconium alkoxides, zirconium salts or complex zirconium compounds, or aluminum salts and aluminum alkoxides. It is also possible to use commercially available colloidal ZrO₂ particles (unstabilized or stabilized) or nanoscale Al₂O₃ or AlOOH particles in the form of sols or powders.

Correspondingly, SiO₂ particles can be produced from hydrolyzable silanes (for example of the above formula (I)). Examples of commercially available dispersions are the aqueous silica sols of Bayer AG (Levasile®) and also colloidal sols from Nissan Chemicals (IPA-ST, MA-ST, MEK-ST, MIBK-ST). Examples of available powders include pyrogenic silicas from Degussa (Aerosil products).

The nanoscale solid particles generally have an average particle diameter below 500 nm, usually not more than 300 nm, preferably not more than 100 nm and in particular not more than 50 nm. This material may be used in the form of a powder, but is preferably used in the form of a sol or of a suspension.

The surface modification of nanoscale solid particles is a known method, as described by the Applicant, for example, in WO 93/21127 (DE 4212633) or WO 96/31572. The production of the surface-modified nanoscale inorganic solid particles can in principle be carried out by two different routes, firstly by surface modification of already produced nanoscale inorganic solid particles and secondly by production of these inorganic nanoscale solid particles using one or more compounds which have appropriate functional moieties. These two routes are illustrated in detail in the above-mentioned patent applications.

Suitable surface modifiers, especially for the surface modification of existing nanoscale particles, are not only inorganic or organic acids but also preferably low molecular weight organic compounds or low molecular weight hydrolyzable silanes with at least one non-hydrolyzable group which can react and/or (at least) interact with groups present on the surface of the solid particles. For example, surface groups disposed on nanoparticles include reactive groups as residual valences, such as hydroxyl groups in the case of metal oxides for example, or thiol groups and thio groups in the case of metal sulfides for example, or amino, amide and imide groups in the case of nitrides for example.

A surface modification of the nanoscale particles can be effected, for example, by mixing the nanoscale particles with suitable surface modifiers illustrated below, optionally in a solvent and in the presence of a catalyst. In the case of silanes as surface modifiers, it is sufficient for modification, for example, to stir them with the nanoscale particles at room temperature for several hours. In the case of ZrO₂, preference is given to using a Y-stabilized ZrO₂ (Y—ZrO₂). Of course, appropriate conditions such as temperature, quantitative ratios, reaction time, etc. depend upon the particular specific reactants and the desired degree of coverage.

The surface modifiers may form, for example, either covalent or ionic (salt-like) or coordinative bonds to the surface of the nanoscale particles, while, among the pure interactions, examples include dipole-dipole interactions, hydrogen bonds and van der Waals interactions. Preference is given to the formation of covalent, ionic and/or coordinative bonds. A coordinative bond is understood to mean complex formation. Between the surface modifier and the particle, it is possible, for example, for a Brønsted or Lewis acid/base reaction, a complex formation or an esterification to take place.

It is also preferred in accordance with the present invention that the surface modifiers have a relatively low molecular weight. For example, the molecular weight may be less than 1500, in particular below 1000 and preferably below 500 or below 400 or even below 300. This of course does not rule out a distinctly higher molecular weight of the compounds (for example up to 2000 and more).

Examples of suitable functional groups of the surface modifiers for attachment to the nanoparticles are carboxylic acid groups, anhydride groups, amide groups, (primary, secondary, tertiary and quaternary) amino groups, SiOH groups, hydrolyzable radicals of silanes (SiX group described below in formula (I)) and C—H-acidic moieties, e.g. β-dicarbonyl compounds. It is also possible for a plurality of these groups to be present simultaneously in one molecule (betaines, amino acids, EDTA, etc.).

Examples of compounds which are used for surface modification are optionally substituted (for example by hydroxyl), saturated or unsaturated mono- and polycarboxylic acids (preferably monocarboxylic acids) having from 1 to 24 carbon atoms (e.g. formic acid, acetic acid, propionic acid, butyric acid, pentanoic acid, hexanoic acid, acrylic acid, methacrylic acid, crotonic acid, citric acid, adipic acid, succinic acid, glutaric acid, oxalic acid, maleic acid and fumaric acid) and monocarboxylic acids having from 1 to 24 carbon atoms with ether bonds (for example methoxyacetic acid, dioxaheptanoic acid and 3,6,9-trioxadecanoic acid) and their anhydrides, esters (preferably $C_1$-$C_4$-alkyl esters) and amides, for example methyl methacrylate.

Examples of further suitable surface modifiers are quaternary ammonium salts of the formula $NR^1R^2R^3R^{4+}X^-$ in which $R^1$ to $R^4$ are each identical or different, aliphatic, aromatic or cycloaliphatic groups having preferably from 1 to 12, in particular from 1 to 8 carbon atoms, for example alkyl groups having from 1 to 12, in particular from 1 to 8 and more preferably from 1 to 6 carbon atoms (e.g. methyl, ethyl, n- and i-propyl, butyl or hexyl), and $X^-$ is an inorganic or organic anion, e.g. acetate, $OH^-$, $Cl^-$, $Br^-$ or $I^-$; mono- and polyamines, especially those of the general formula $R_{3-n}NH_{n'}$, in which $n=0$, 1 or 2 and the R radicals are each independently alkyl groups having from 1 to 12, in particular from 1 to 8 and more preferably from 1 to 6 carbon atoms (e.g. methyl, ethyl, n- and i-propyl, butyl or hexyl) and ethylenepolyamines (e.g. ethylenediamine, diethylenetriamine, etc.); amino acids; imines; β-dicarbonyl compounds having from 4 to 12, in particular from 5 to 8 carbon atoms, for example acetylacetone, 2,4-hexanedione, 3,5-heptanedione, acetoacetic acid and $C_1$-$C_4$-alkyl acetoacetates such as ethyl acetoacetate; and silanes, for example the hydrolyzable silanes having at least one unhydrolyzable group of the general formula (I) below, where one or more of the R groups may also be substituted by a functional group, for example with a (meth)acryloyl, epoxy (including glycidyl or glycidyloxy), thiol, carboxyl, carboxylic anhydride or amino group.

Purely organic surface modifiers used with preference are monocarboxylic acids having from 1 to 24 carbon atoms, for example formic acid, acetic acid, propionic acid, butyric acid, hexanoic acid, methacrylic acid, citric acid, stearic acid, methoxyacetic acid, dioxaheptanoic acid and 3,6,9-trioxadecanoic acid, and also the corresponding acid hydrides and amides and β-dicarbonyl compounds having from 4 to 12, in particular having from 5 to 8 carbon atoms, for example diketones such as acetylacetone, 2,4-hexanedione, acetoacetic acid and $C_{1-4}$-alkyl acetoacetates such as ethyl acetoacetate.

For the in situ production of nanoscale inorganic solid particles with polymerizable/polycondensable surface groups, reference is made to WO 98/51747 (DE 19746885).

As mentioned above, in an advantageous embodiment the binder comprises a nanocomposite that comprises the nanoparticles in a polycondensate or a precursor thereof, the condensate being prepared preferably in the presence of the nanoparticles, so that the hydrolyzable starting compounds for the condensate also surface-modify the nanoparticles.

The inorganically or organically modified inorganic polycondensates or precursors thereof are produced preferably by the sol-gel process, by hydrolysis and condensation of the hydrolyzable starting compounds (especially hydrolyzable silanes of the formula (I) below). Precursors are understood to mean especially prehydrolyzates and/or precondensates of the hydrolyzable starting compounds with a low degree of condensation. In the sol-gel process, the hydrolyzable compounds are hydrolyzed with water, optionally with heating or acidic or basic catalysis, and partly condensed. It is possible to use stoichiometric amounts of water, but lesser or greater amounts may also be used. The sol which forms may be adjusted to the viscosity desired for the composition by suitable parameters, for example degree of condensation, solvent or pH. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

The polycondensates or their precursors are produced preferably in the presence of the nanoparticles. The nanocomposite comprising nanoscale solid particles is accordingly preferably obtainable by the sol-gel process, by reacting nanoscale solid particles with one or more silanes of the general formula:

$$R_xSiA_{(4-x)} \qquad (I)$$

in which the A radicals are the same or different and are hydroxyl groups or hydrolyzable groups, the R radicals are the same or different and are non-hydrolyzable groups, and x is 0, 1, 2, 3, where, preferably, $x \geq 1$ for at least 50% of the amount of the silanes.

The nanoscale solid particles are in particular surface-modified by the reaction with the silanes. When only silanes of the formula (I) where $x=0$ are used, purely inorganic nanocomposites are obtained, otherwise the preferred organic-inorganic nanocomposites are obtained.

In the general formula (I), the hydrolyzable A groups, which may be the same or different from one another, for example hydrogen, hydroxyl or halogen (F, Cl, Br or I), alkoxy (preferably $C_{1-6}$-alkoxy, for example methoxy, ethoxy, n-propoxy, i-propoxy and butoxy), aryloxy (preferably $C_{6-10}$-aryloxy, for example phenoxy), alkaryloxy (e.g. benzyloxy), acyloxy (preferably $C_{1-6}$-acyloxy, for example acetoxy or propionyloxy), alkylcarbonyl (preferably $C_{2-7}$-alkylcarbonyl, for example acetyl), amino, monoalkylamino or dialkylamino having preferably from 1 to 12, in particular from 1 to 6 carbon atoms. Preferred hydrolyzable radicals are halogen, alkoxy groups and acyloxy groups. Particularly preferred hydrolyzable radicals are $C_{2-4}$-alkoxy groups, in particular ethoxy. The hydrolyzable A groups mentioned may optionally bear one or more typical substituents, for example halogen atoms or alkoxy groups.

The non-hydrolyzable R radicals of the formula (I) are, for example alkyl (e.g. $C_{1-20}$-alkyl, in particular $C_{1-4}$-alkyl, such as methyl, ethyl, n-propyl, i-propyl, n-butyl, i-butyl, sec-butyl and tert-butyl), alkenyl (e.g. $C_{2-20}$-alkenyl, in particular $C_{2-4}$-alkenyl, such as vinyl, 1-propenyl, 2-propenyl and butenyl), alkynyl (e.g. $C_{2-20}$-alkynyl, in particular $C_{2-4}$-alkynyl, such as acetylenyl or propargyl), aryl (in particular $C_{6-10}$-aryl, such as phenyl and naphthyl) and corresponding aralkyl and alkaryl groups such as tolyl and benzyl, and cyclic $C_3$-$C_{12}$-alkyl and -alkenyl groups such as cyclopropyl, cyclopentyl and cyclohexyl. The R radicals may optionally have one or more customary substituents, for example halogen, alkoxy, hydroxyl, amino, (meth)acryloyl and epoxy groups.

Particularly preferred R radicals are optionally substituted $C_{1-4}$-alkyl groups, in particular methyl and ethyl, and optionally substituted $C_{6-10}$-aryl groups, in particular phenyl.

It is also preferred that x in the above formula (I) is 0, 1 or 2 and more preferably 0 or 1. Moreover, preferably at least 60% and in particular at least 70% of the amount have the value $x=1$, the rest consisting preferably of silanes of the formula (I) where $x=0$.

Silanes used with preference are alkyl- and aryltrialkoxysilanes and/or tetraalkoxysilanes such as methyltriethoxysilane (MTEOS), ethyltriethoxysilane, phenyltriethoxysilane (PTEOS), tetraethoxysilane (TEOS) or tetramethoxysilane. The inventive polycondensate may be prepared, for example, from pure methyltriethoxysilane (MTEOS) or from mixtures of MTEOS and tetraethoxysilane (TEOS) or MTEOS and phenyltriethoxysilane (PTEOS) and TEOS.

The silanes of the general formula (I) used in accordance with the invention may be used fully or partly in the form of precondensates, i.e. compounds which have been formed by partial hydrolysis of the silanes of the formula (I), alone or in a mixture with other hydrolyzable compounds. Such oligomers preferably soluble in the reaction mixture may be straight-chain or cyclic, low molecular weight partial condensates having a degree of condensation of, for example, from about 2 to 100, in particular 2-6.

In one embodiment, the hydrolyzable silanes may be hydrolyzed and condensed with a sub-stoichiometric amount of water, based on the hydrolyzable groups, to form a nanocomposite sol. The amount of water used for the hydrolysis and condensation is preferably from 0.1 to 0.9 and more preferably from 0.25 to 0.8 mol of water per mole of hydrolyzable groups present. In the case of a sub-stoichiometric addition of water, the binders may be stored in a stable manner over a certain period and optionally activated by an additional addition of water before the addition of the release agents or before application to the substrate.

The hydrolysis and condensation of the silanes is carried out under sol-gel conditions, for example in the presence of acidic condensation catalysts (e.g. hydrochloric acid) at a pH preferably between 1 and 7, more preferably between 1 and 3.

Apart from the solvent which is formed in the hydrolysis, preference is given to not employing any further solvent, but it is possible, if desired, to use water, alcoholic solvents (e.g. ethanol) or other polar, protic and aprotic solvents (tetrahydrofuran, dioxane). When other solvents have to be used, preference is given to ethanol and 1-propanol, 2-propanol, ethylene glycol and derivatives thereof (e.g. diethylene glycol monoethyl ether, diethylene glycol monobutyl ether).

When the binder comprises a polycondensate or a precursor thereof, the fraction of polycondensate in the binder, based on the total weight of the coating after the curing (finished product), is usually below 95% by weight, preferably below 80% by weight and more preferably below 70% by weight.

As already explained above, the polycondensate is preferably prepared in the presence of the nanoparticles, so that the nanoparticles are embedded in the polycondensate in surface-modified form. In the hydrolysis and condensation of the silanes, a portion of the silanes thus reacts with reactive groups on the surface of the nanoparticles and thus leads to the surface modification of the nanoparticles, which also leads to stronger bonding of the nanoparticles within the polycondensate matrix.

The coating composition may comprise further additives which are added in industry typically depending on the purpose and desired properties. Specific examples are fillers, thixotropic agents, aforementioned solvents, other matrix-forming components, organic dispersants and binders such as polyvinyl butyrals, polyethylene glycols, polyethyleneimines, polyvinyl alcohols, polyvinylpyrrolidones, celluloses or cellulose derivatives, polyols, organic and inorganic chromatic pigments, including in the nanoscale range, metal colloids, for example as carriers of optical functions, dyes, UV absorbers, glass-forming components (e.g. boric acid, boric esters, sodium ethoxide, potassium acetate, aluminum sec-butoxide), corrosion protectants (e.g. tannic acid), lubricants, leveling agents, wetting agents, adhesion promoters and catalysts, for example curing catalysts such as metal salts, and metal alkoxides.

Suitable fillers are, for example, inorganic filler particles which may be the same materials as have also been specified above for the nanoparticles.

Examples are $SiO_2$, $Al_2O_3$, $ZrO_2$, $TiO_2$, mullite, boehmite, $Si_3N_4$, SiC and AlN. The mean particle diameter is usually less than 100 μm, in particular less than 10 μm, preferably less than 5 μm and more preferably less than 1 μm.

Fillers may be added optionally at any time. For instance, these fillers may be incorporated in the course of preparation of a release agent particle suspension, but they may also be added to the binder in the form of powders or suspensions.

To disperse the solid particles in the binder, it is possible to use customary stirrer units (dissolvers, directed jet mixers), ultrasound treatment, kneaders, screw extruders, roll mills, vibratory mills, planetary mills, mortar mills, and in particular attritor mills. For the dispersion of the nanoscale powders, preference is given to attritor mills with small grinding bodies, usually with a diameter of less than 2 mm, preferably less than 1 mm and more preferably less than 0.5 mm.

To prepare the release agent particle suspensions, preference is given to dispersing with high-speed dispersion units with rotor/stator systems, such as Ultra-Turrax or centrifugal homogenizers. Particular preference is given to units with multistage rotor/stator systems (Cavitron high-performance centrifugal homogenizer).

The release agent particles can be added by mixing separate release agent suspensions and binder sols, but they may also be added by incorporation/dispersion of the release agent particles into the binder sol. Preference is given to preparing by mixing separate release agent suspensions with separate binder sol with stirring.

In some cases, it is advantageous, before the application of the coating composition to the substrate, to adjust the pH of the binder and/or of the size (binder+release agent). For this purpose, a base is usually used, preferably a base in an alcoholic solvent and more preferably an ethanolic sodium ethoxide solution. The pH is usually adjusted between 1 and 7, preferably between 2.5 and 5 and more preferably between 3 and 4. Salts formed during the course of the reaction may be removed by sedimentation and/or centrifugation. After the completion of the size, it is advantageous in some cases to homogenize the size further before the application. This is usually done by stirring the size, usually overnight.

In some cases, it is also advantageous, by additions of precise amounts of water, to enable a defined hydrolysis/condensation reaction in the finished size (binder sol+release agent); usually, this establishes an overall water content of less than 1 mol of water per mole (of the total amount used of) hydrolyzable group.

Suitable substrates for the coatings or mold release layers are all conventional substrates. Examples of a suitable substrate are substrates or mold surfaces made of metal, semiconductor, glass, ceramic, glass-ceramic, plastic or inorganic-organic composite materials. For high-temperature applications, thermally stable substrates are appropriately used, for example metals, semiconductors, glass, ceramic, glass-ceramic or heat-resistant plastics. They are preferably inorganic substrates.

Particularly suitable substrate materials are metals such as iron, chromium, copper, nickel, aluminum, titanium, tin and zinc and alloys thereof (cast iron, cast steel, steels, for example unalloyed, low-alloyed, high-alloyed steels, bronzes, brass) and also inorganic nonmetals such as ceramics, refractory materials and glasses, all substrates being present in the form of foils, fabrics, sheets/plates and moldings.

Examples of semiconductors are silicon, for example in the form of wafers, and indium tin oxide layers (ITO layers) on glass. The glass used may be all conventional glass types, for example silica glass, borosilicate glass or soda-lime silicate glass. Examples of plastics substrates are polycarbonate, polymethyl methacrylate, polyacrylates, polyethylene terephthalate.

The substrates may be pretreated, for example for cleaning, by a corona treatment, or with a preliminary coating (for example a lacquer or a metalized surface).

The release agent-containing coating sols can be applied to the substrates/mold surfaces by means of common coating methods such as knife-coating, dipping, flow-coating, spinning, spraying, brushing and painting. To improve the adhesion, it may be found in some cases to be advantageous to treat the substrate before the contacting with diluted or undiluted binder sols or precursors thereof or other primers.

The inventive mold release agent covers, for example, preferably all surfaces of casting molds which come into contact with the partly molten or molten metal.

The solids content of the sizes (release agent plus solids content of the binder sol) may be adjusted depending on the selected coating method by adding solvent and/or water. For a spray coating, a solids content between 2 and 70% by weight, preferably between 5 and 50% by weight and more preferably between 10 and 30% by weight is usually established. For other coating processes, it is of course also possible to establish another solids content. It is equally possible to add thixotropic agents or standardizers, for example cellulose derivatives.

An isostatic compaction of freshly applied release layers before the final curing can further increase the packing density and thus likewise distinctly increase the strength and the lifetime of the layer. To this end, the application of a further, virtually binder-free release agent release layer is recommended, which prevents adhesion of the layer which has not yet cured with the surrounding medium in the isostatic compaction.

The final curing may be preceded by one or more drying stages at room temperature or slightly elevated temperature, for example in a force-air drying cabinet and/or by heating/heat treatment, for example of the mold itself. In the case of oxidation-sensitive substrates, the drying and/or subsequent curing may be effected in a protective gas atmosphere ($N_2$, Ar) or vacuum. In general, curing is effected by heating.

The thermal curing is effected, taking into account the thermal sensitivity, preferably by heat treatment at temperatures above 50° C., preferably above 200° C. and more preferably above 300° C. The layers may also be baked out at higher temperatures, preferably at temperatures of from 500 to 700° C., when the substrate is sufficiently stable at these temperatures, for example against oxidation or scale formation. The thermal treatment may result in the burning-off of organic constituents.

However, the layers themselves even survive temperatures of over 1000° C. in inert atmosphere; the inert atmosphere is necessary owing to the oxidation of the substrate or of the release agent which otherwise occurs. The binders themselves are stable even at 1000° C. in normal atmosphere.

The thermal treatment of the coatings (for example as the mold release layers) can be effected, for example, in ovens, by a hot gas, by direct gas flaming of the surfaces, by direct or indirect IR heating or else in situ by contacting the release layers with the liquid (molten or partially molten) cast metal.

The coated substrates produced are suitable, in the event of appropriate selection of the substrate, as anti-adhesive high-temperature layers owing to the thermal stability of the layers. Specific applications are, for example, mold release layers, in particular for the casting of metals, and tribological layers owing to the good sliding properties.

DETAILED DESCRIPTION OF THE INVENTION

The examples which follow serve to further illustrate the present invention.

EXAMPLES

1. Synthesis of Silicatic Binder Sols 1.1. MTKS; $R_{OR}$ 0.4

65.5 g of MTEOS and 19.1 g of TEOS are mixed. Half of the mixture is reacted with 14.2 g of silica sol (LEVASIL 300/30) and 0.4 ml of concentrated hydrochloric acid with vigorous stirring. After 5 minutes, the second half of the silane mixture is added to the mixture which is stirred further for another 5 minutes. After standing overnight, the mixture is adjusted to a pH of 3 with ethanolic sodium ethoxide solution. The salts formed in the course of the reaction are removed by centrifugation.

1.2. MTKS-PT; $R_{OR}$ 0.4

65.5 g of MTEOS and 19.1 g of TEOS are mixed and reacted with 28.4 g of silica sol (LEVASIL 300/30) and 0.8 ml of concentrated hydrochloric acid with vigorous stirring. After 5 minutes, a further silane mixture consisting of 88.3 g of phenyltriethoxysilane (PTEOS) and 19.1 g of TEOS is added to the mixture which is stirred further for another 5 minutes. After standing overnight, the mixture is adjusted to a pH of 3 with ethanolic sodium ethoxide solution. The salts formed in the course of the reaction are removed by centrifugation.

2. Production of Silicatically Bonded Layers 2.1. Preparation of Ethanolic $MoS_2$ Suspensions 333 g of molybdenum sulfide powder (Molyduval, submicron $MoS_2$) is stirred into 649.2 g of anhydrous, denatured ethanol (MEK) in which 16.8 g of polyvinyl butyral (Hoechst: Mowital® B 30 T) is dissolved. The suspension is charged into a coolable stirred vessel and dispersed with a high-speed Ultra-Turrax T 25 at a rotational speed of 24,000 $min^{-1}$ for the duration of 30 min.

2.2. Preparation of Ethanolic Graphite Suspensions 333 g of graphite powder (Lonza, HSAG 100) is stirred into 600 g of anhydrous, denatured ethanol (MEK) in which 66 g of polyacrylic acid 50,000 (Polyscience; 25% in $H_2O$) is dissolved. The suspension is charged into a coolable stirred vessel and dispersed with a high-speed Ultra-Turrax T 25 at a rotational speed of 24,000 $min^{-1}$ for the duration of 30 min.

2.3. Production of $MoS_2$/MTKS-PT Layers; $MoS_2:SiO_2=2:1$ 30 g of MTKS-PT $R_{OR}$ 0.4 (corresponds to approx. 10 g of $SiO_2$) is activated with 1.5 g of demineralized water and stirred for 1 h. Afterward, the binder is admixed with 60 g of the above ethanolic release agent suspension with a solids content of approx. 33% by weight (corresponds to approx. 20 g of $MoS_2$) with stirring. The solids content of the coating system (based on the total mass of coating after the thermal curing) is approx. 33% by weight.

This coating system can be applied by means of common coating processes; the solids content is adjusted depending on the application process to be employed.

2.4. Production of Graphite/MTKS-PT Layers; Graphite: $SiO_2=1:1$ 50 g of the above ethanolic graphite suspension with a solids content of 30% by weight is admixed with stirring with 50 g of MTKS-PT $R_{OR}$ 0.4. The solids content of the size (based on release agent) is 15% by weight; after a stirring time of 1 day, the suspension can be processed. (N.B.: the water required for the hydrolysis is already present in the graphite suspension.)

This coating system can be applied by means of common coating processes; the solids content is adjusted depending on the application process to be employed.

3. Preparation of an $Al_2O_3/ZrO_2$ Binder Phase 3.1. nAnZ Binder (1:1)

100 g of boehmite (Disperal®, from Sasol Hamburg) is stirred into 900 g of water, in the course of which a constant pH of 3 is established by adding acetic acid. The suspension was stirred for 24 h and the coarse agglomerates were subsequently removed by sedimentation (48 h).

11.6 g of a nanodisperse, Y-stabilized, surface-modified $ZrO_2$ powder (specific surface area of 200 g/cm³, 16% by weight of trioxadecanoic acid) is stirred into 128.37 g of the above boehmite sol (correspond to 10 g of $Al_2O_3$) and dispersed by ultrasound treatment (Branson Sonifier type) for the period of 30 minutes.

To prepare the binder phase, 35 g of the above corundum suspension (corresponding to 7 g of $Al_2O_3$) are first added dropwise to 70 g of the nAnZ binder sol.

4. Production of $Al_2O_3/ZrO_2$-Bonded Layers 4.1. Preparation of Aqueous $MoS_2$ Suspensions 250 g of $MoS_2$ powder (Molyduval, van Laar GmbH, submicron-fine powder $MoS_2$) is stirred into 743.75 g of deionized water in which 6.25 g of polyvinyl alcohol (Hoechst: PVA 4/88) is dissolved. The suspension is charged into a coolable stirred vessel and dispersed with a high-speed Ultra-Turrax T 25 for the period of 30 min.

4.2. Preparation of Aqueous Graphite Suspensions 250 kg of graphite powder (Timcal, TIMREX KS 4) is stirred into 743.75 g of deionized water in which 6.25 g of a surfactant (ICI: Tween 80) is dissolved. The suspension is charged into a coolable stirred vessel and dispersed with a high-speed Ultra-Turrax T 25 for the period of 30 min.

4.3. Production of an $MoS_2$-AnAnZ Layer 80 g of $Al_2O_3$ (TM-DAR, from TAI MEI) is dispersed in 318 g of $H_2O$ and 2 g of acetic acid in an attritor mill (PE 075 from Netzsch) with 330 g of grinding balls ($Al_2O_3$; diameter 4-5 mm) in a PE grinding cup (+rotor) at 700 rpm for a period of 2 h.

70 g of nAnZ sol (corresponding to 10 g of solid) is mixed with 35 g of the above $Al_2O_3$ suspension (corresponding to 7 g of $Al_2O_3$) and then with 12 g of the aqueous $MoS_2$ suspension (corresponding to 3 g of solid) with stirring.

For better processing, a pH in the range of approx. 5-6 can be established by adding aqueous ammonia, then the size can be applied by means of common processes for coating.

4.4. Production of a Graphite AnAnZ Layer 80 g of $Al_2O_3$ (TM-DAR, from TAI MEI) is dispersed in 318 g of $H_2O$ and 2 g of acetic acid in an attritor mill (PE 075 from Netzsch) with 330 g of grinding balls ($Al_2O_3$; diameter 4-5 mm) in a PE grinding cup (+rotor) at 700 rpm for a period of 2 h.

70 g of nAnZ sol (correspond to 10 g of solid) is mixed with 35 g of the above $Al_2O_3$ suspension (corresponding to 7 g of $Al_2O_3$) and then with 12 g of the aqueous graphite suspension (corresponding to 3 g of solid) with stirring.

For better processing, a pH in the range of approx. 5-6 can be established by adding aqueous ammonia, then the size can be applied by means of common processes for coating.

What is claimed is:

1. A substrate having a coating thereon, wherein the coating is anti-adhesive and is made from a coating composition comprising
    (a) solid particles of at least one release agent different from boron nitride, which particles have a sheet lattice structure, and
    (b) a binder comprising a nanocomposite of surface-modified nanoscale solid particles in an organically modified inorganic polycondensate, the nanocomposite being obtained by reacting the nanoscale particles with one or more silanes of general formula:

$$R_xSiA_{(4-x)} \qquad (I)$$

wherein the radicals A are the same or different and are hydroxyl groups or hydrolyzable groups, the radicals R are the same or different and are non-hydrolyzable groups and x is 0, 1, 2 or 3, the silanes of formula (I) comprising at least one silane wherein x in formula (I) equals 0.

2. The substrate of claim 1, wherein in formula (I) $x \geq 1$ in at least 50 mass-% of the one or more silanes.

3. The substrate of claim 1, wherein the nanoscale solid particles are selected from one or more of metal oxide particles and carbon black particles.

4. The substrate of claim 1, wherein the nanoscale solid particles comprise one or more of $SiO_2$, $TiO_2$, $ZrO_2$, $Al_2O_3$, AlOOH, $Y_2O_3$, $CeO_2$, $SnO_2$, an iron oxide, and $Ta_2O_5$.

5. The substrate of claim 1, wherein the nanoscale solid particles comprise one or more of $TiO_2$, $ZrO_2$, $Al_2O_3$, AlOOH, $Y_2O_3$, $CeO_2$, $SnO_2$, an iron oxide, and $Ta_2O_5$.

6. The substrate of claim 1, wherein the coating composition further comprises one or more inorganic fillers.

7. The substrate of claim 1, wherein the coating comprises less than 70% by weight of the nanoscale solid particles.

8. The substrate of claim 1, wherein the coating comprises a high-temperature-resistant layer.

9. A mold comprising a mold release layer, wherein the mold comprises the substrate of claim 1.

10. The mold of claim 9, wherein the mold is a metal casting mold.

11. The substrate of claim 1, wherein the coating comprises a tribological layer.

12. The substrate of claim 1, wherein the solid particles (a) comprise one or more of graphite, graphite compounds, metal sulfides, metal selenides and metal tellurides.

13. The substrate of claim 12, wherein the particles (a) comprise one or more of graphite, fluorinated graphite, $MoS_2$ and $WS_2$.

14. The substrate of claim 12, wherein the particles (a) have an average particle diameter of less than 30 μm.

15. The substrate of claim 1, wherein the coating comprises from 30 to 70% by weight of the particles (a).

16. A substrate having a coating thereon, wherein the coating is anti-adhesive and is made from a coating composition comprising
    (a) solid particles of at least one release agent different from boron nitride, which particles have a sheet lattice structure, and
    (b) a binder comprising surface-modified nanoscale solid particles selected from one or more of ZnO, CdO, $GeO_2$, $TiO_2$, $ZrO_2$, $CeO_2$, $SnO_2$, $Al_2O_3$, AlO(OH), aluminum hydroxide, $B_2O_3$, $In_2O_3$, $La_2O_3$, $Y_2O_3$, an iron oxide, $Cu_2O$, $Ta_2O_5$, $Nb_2O_5$, $V_2O_5$, $MoO_3$, $WO_3$, a sulfide, a selenide, a telluride, a halide, a carbide, an arsenide, an antimonide, a nitride, a phosphide, a zirconate, an aluminate, a stannate, a mixed oxide, carbon black, and graphite.

17. The substrate of claim 16, wherein the nanoscale solid particles comprise one or more of $TiO_2$, $ZrO_2$, $Al_2O_3$, AlOOH, $Y_2O_3$, $CeO_2$, $SnO_2$, an iron oxide, and $Ta_2O_5$.

18. The substrate of claim 16, wherein the coating comprises less than 70% by weight of the nanoscale solid particles.

19. The substrate of claim 16, wherein the nanoscale solid particles have been surface-modified with a surface modifier having a molecular weight of less than 1,500.

20. The substrate of claim 19, wherein the surface modifier comprises one or more of an anhydride group, an amide group, an amino group, and a β-dicarbonyl group.

21. The substrate of claim 16, wherein the anti-adhesive coating comprises a high-temperature-resistant layer.

22. The substrate of claim 16, wherein the coating composition further comprises one or more inorganic fillers.

23. A mold comprising a mold release layer, wherein the mold comprises the substrate of claim 16.

24. The mold of claim 23, wherein the mold is a metal casting mold.

25. The substrate of claim 16, wherein the coating comprises a tribological layer.

26. The substrate of claim 16, wherein the solid particles (a) comprise one or more of graphite, graphite compounds, metal sulfides, metal selenides and metal tellurides.

27. The substrate of claim 16, wherein the particles (a) comprise one or more of graphite, fluorinated graphite, $MoS_2$ and $WS_2$.

28. The substrate of claim 16, wherein the coating comprises from 30 to 70% by weight of the particles (a).

29. A substrate having a coating thereon, wherein the coating is anti-adhesive and is made from a coating composition comprising (a) solid particles of at least one release agent different from boron nitride, which particles have a sheet lattice structure, and (b) a binder comprising nanoscale solid particles which have been surface-modified with a surface modifier having a molecular weight of less than 1,500 and comprising one or more of an anhydride group, an amide group, an amino group, and a β-dicarbonyl group.

30. The substrate of claim 29, wherein the nanoscale solid particles comprise one or more of $SiO_2$, $TiO_2$, $ZrO_2$, $Al_2O_3$, AlOOH, $Y_2O_3$, $CeO_2$, $SnO_2$, an iron oxide, and $Ta_2O_5$.

31. The substrate of claim 29, wherein the solid particles (a) comprise one or more of graphite, graphite compounds, metal sulfides, metal selenides and metal tellurides.

32. A method of providing a substrate with an anti-adhesive coating, wherein the method comprises applying the coating composition of claim 1 onto the substrate and curing the applied coating composition.

33. A method of providing a substrate with an anti-adhesive coating, wherein the method comprises applying the coating composition of claim 16 onto the substrate and curing the applied coating composition.

34. A method of providing a substrate with an anti-adhesive coating, wherein the method comprises applying the coating composition of claim 29 onto the substrate and curing the applied coating composition.

* * * * *